Jan. 17, 1961  J. R. WRIGHT ET AL  2,968,213
REFRACTOR HAVING CYLINDRICAL LENS CARRIERS AND DRIVE MEANS
Filed July 1, 1957  3 Sheets-Sheet 1

INVENTORS
JOHN R. WRIGHT
GEORGE F. SCHENK
BY
Herbert C. Kimball
ATTORNEY

Jan. 17, 1961   J. R. WRIGHT ET AL   2,968,213
REFRACTOR HAVING CYLINDRICAL LENS CARRIERS AND DRIVE MEANS
Filed July 1, 1957   3 Sheets-Sheet 2

INVENTORS
JOHN R. WRIGHT
GEORGE F. SCHENK
BY
Herbert C. Kimball
ATTORNEY

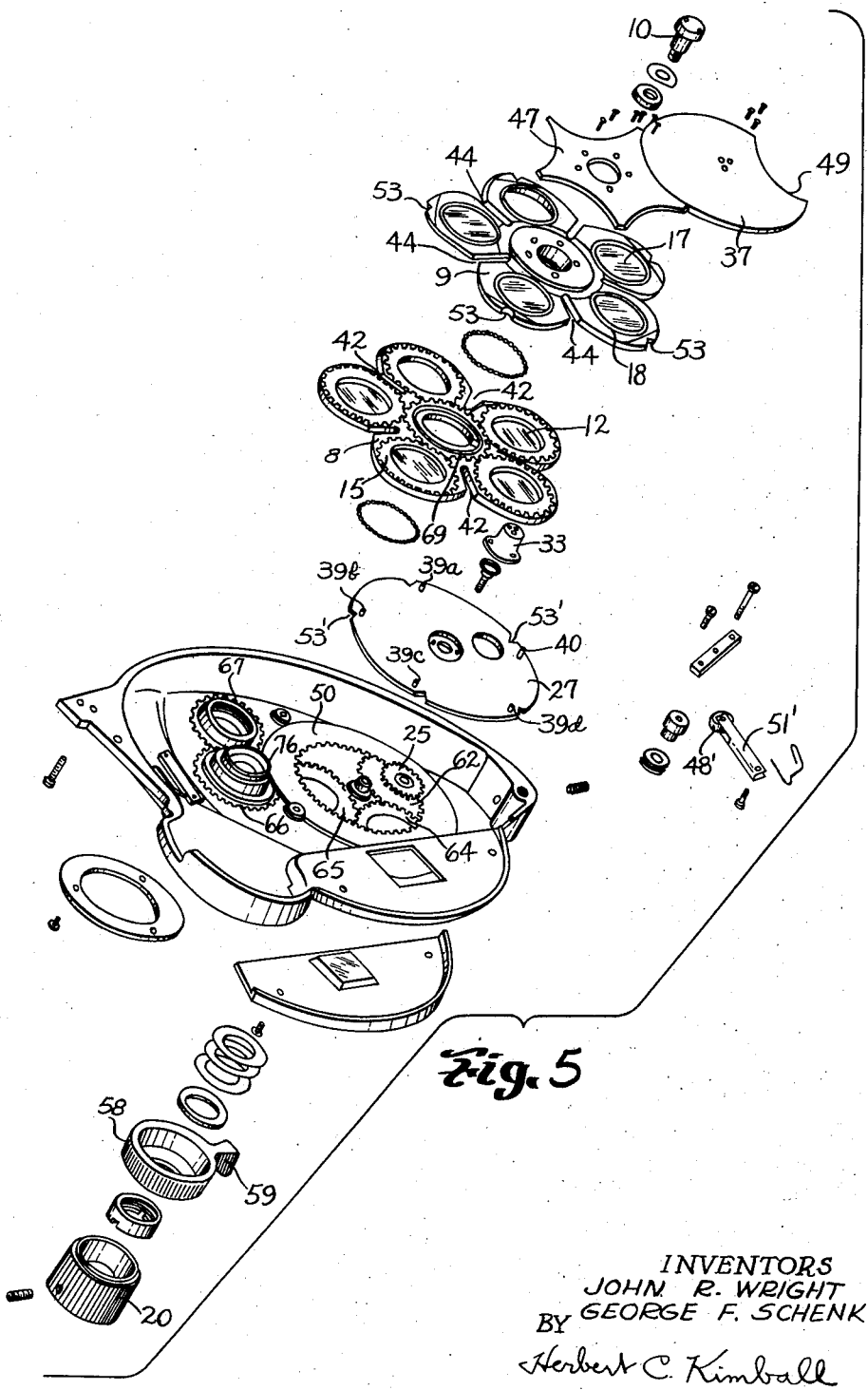

*(2,968,213)*

United States Patent Office

2,968,213
Patented Jan. 17, 1961

2,968,213

REFRACTOR HAVING CYLINDRICAL LENS CARRIERS AND DRIVE MEANS

John R. Wright, Eggertsville, and George F. Schenk, Buffalo, N.Y., assignors to American Optical Company, Southbridge, Mass., a voluntary association of Massachusetts Filed July 1, 1957, Ser. No. 669,073

1 Claim. (Cl. 88—22)

In our copending application Serial No. 629,059 filed December 18, 1956, for refractors we have described and claimed mechanism useful in such instruments for positioning before a patient's eyes the lens or lenses selected by a practitioner in determining the shortcomings of the patient's vision. The present invention relates to mechanism useful in such instruments for positioning a practitioner's choice from a graded series of cylindrical lenses before the eyes of a patient afflicted with astigmatism.

An object of the invention is to control two carriers for such cylindrical lenses, so that the selected lenses will be accurately aligned in front of the respective eyes of the patient.

In the drawings which show an illustrative form of our invention,

Fig. 5 is an exploded view of the mechanism shown in Figs. 3 and 4;

Figure 1:
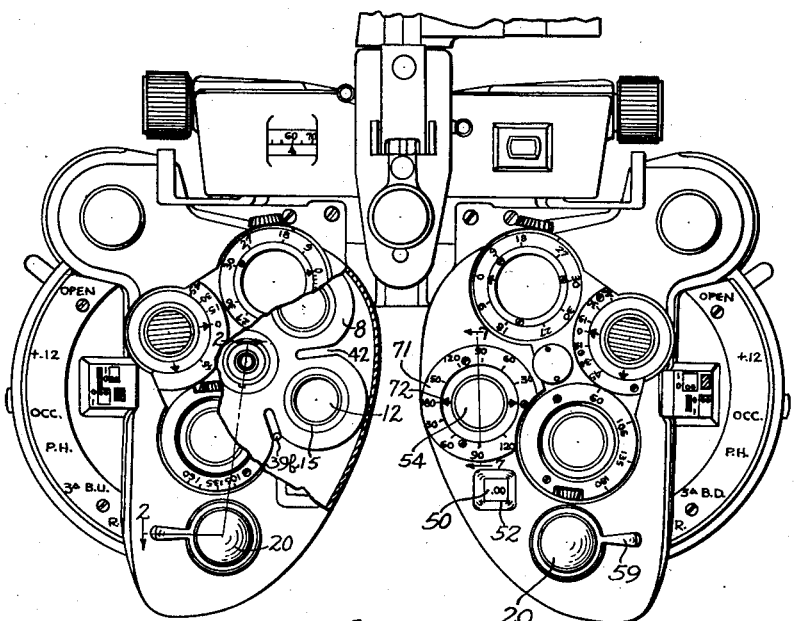
Fig. 1 is a front view in elevation partly broken away of an instrument embodying our invention, this view showing many of the controls by which the instrument is operated.

The side of the instrument shown in Fig. 1, herein referred to as the front, is the side on which the practitioner stands. The latter manipulates the controls to select and place in front of the patient's eyes (the patient being on the other side of the instrument) such lenses as will aid the practitioner in testing the vision of the patient, and in determining the proper correction. We are here concerned with patients afflicted with astigmatism, and the mechanism about to be described enables the practitioner to place before the respective eye of a patient the cylindrical lens or combination of lenses which he has selected for his tests.

Figure 2:
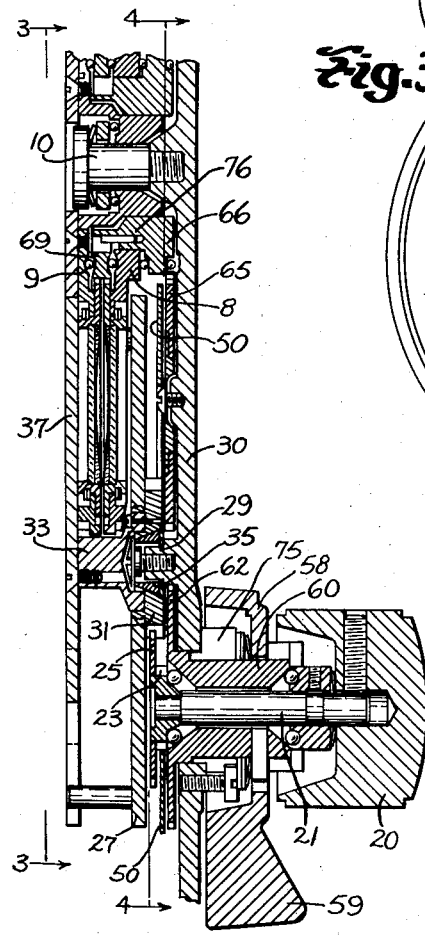
Fig. 2 is a partial section on the line 2—2 in Fig. 1.
Figure 3:
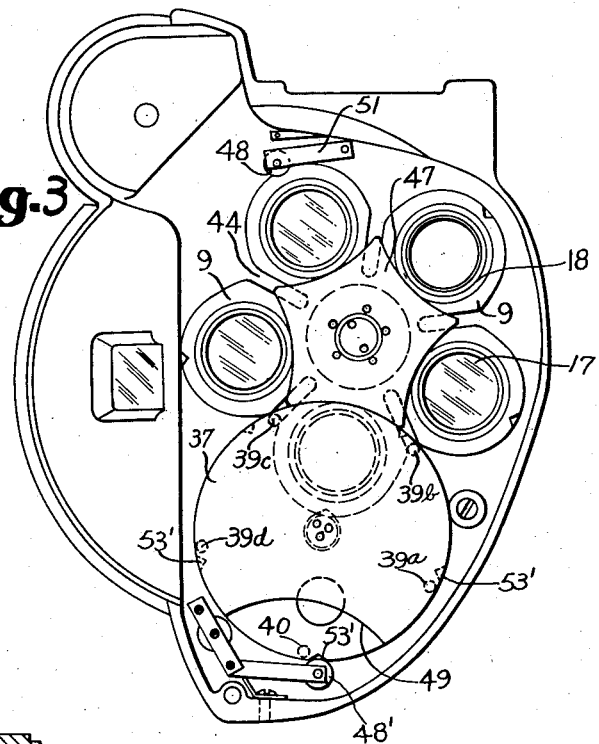
Fig. 3 is a sectional view looking forwardly at the mechanism from the interior, the section being indicated by line 3—3 in Fig. 2.

There is a lens battery for each eye, but as substantially the only difference between the two batteries is that one is a right hand battery and the other is a left hand battery, we will discuss only one lens battery in describing the invention. Two carriers 8 and 9 (compare Figs. 5 and 2) are rotatably mounted in superimposed relation on a stud 10. The weaker lenses 12 (four in number, plus a vacant space) are mounted in cells 15, which are rotatable relative to the carrier 8 in which they are supported. (The purpose of such rotation will be described later.) The stronger lenses 17 are mounted in cells 18, these cells again being rotatable relative to the carrier 9 which supports them.

A knob 20 (see the front of the instrument, Fig. 1) on an actuating shaft 21 rotates a dual gear on the inner end of shaft 21. This dual gear is made up of a small front gear 23 carrying on its hub a larger rear gear 25. A driver 27 rotatably mounted on a boss 29 extending from the rear face of the housing 30 is driven by a gear 31 meshing with gear 25. The gear 31 may be formed integrally with the front hub of the driver 27. A rearwardly projecting hub 33 surrounds a bearing 35 about which the driver 27 and hub 33 rotate. To the hub 33 is secured the locking plate 37 (see Fig. 5) which functions as part of a Geneva movement to hold the strong cylindrical lens carrier 9 stationary until the time arrives for it to advance the space of one lens.

Assuming the rotation of the gear 25 (and neglecting momentarily the simultaneous rotation of gear 23) the driver 27 is rotated. The driver 27 extends on one side and in overlapping relation with the carriers 8 and 9 and is furnished with five driving pins of which four (numbered 39a, 39b, 39c and 39d) are short enough to mesh only with the carrier 8, while the fifth, the pin numbered 40, is long enough to mesh both with the carrier 8 and with the carrier 9. The five driving pins 39a, 39b, 39c, 39d and 40 mesh with the carrier 8 by entering successively the five slots 42. The long driving pin 40 enters not only a slot 42 (in carrier 8) but also one of the five slots 44 in the carrier 9.

It is only when the pin 40 engages a slot 44 that the carrier 9 can rotate, because a star wheel 47 fixed to the carrier 9 is at other times engaged by the locking plate 37. This locking plate 37 has the greater part of its circumference circular which engages nicely in one of the recesses of the star wheel 47, as is conventional in a Geneva movement. At the time the pin 40 enters a slot 44, the recess or scallop 49 in the circumference of locking plate 37 permits the adjacent point of star wheel 47 to make its arcuate movement, which corresponds to the advance of the carrier 9 by the space of one lens. As soon as the pin 40 leaves the previously mentioned slot, the circular portion of the circumference of locking plate 37 is turned toward the star wheel 47 so as to engage in the next adjacent recess of the star wheel.

Accordingly, the carrier 8 is driven by the driver 27 substantially as though gearing connected them. For a complete revolution of driver 27, the carrier 8 is driven through a complete revolution. The carrier 9, on the other hand is driven as a Geneva movement effects its drive, namely a step by step advance of the carrier 9; and a complete revolution of the driver 27 advances the carrier 9 by the space of one lens.

The cell 18 arriving in operative position in the sight opening 54 must assume accurate alignment both with the center line of the sight opening and with the cell 15. A roller 48 carried by a spring pressed lever 51 acts as a click to drop into depressions 53 in the carrier 9, one depression for each cell 18. Only a light spring pressure is required to accomplish the nice adjustment of the carrier 9 needed for alignment, as the locking plate 37 resists accidental displacement of the carrier 9 due to the engagement of its circular rim with the star wheel 47 as above described. The carrier 8 is nicely adjusted to provide the desired accurate alignment by a click made up of a roller 48' carried by a spring pressed lever 51'. The roller 48' cooperates with depressions 53' provided in the driver 27, the latter controlling the position of the carrier 8 at all times due to the engagement of its pins in the slots 42. These clicks are stowed in odd corners of the housing where they do not necessitate any increase in the depth of the housing.

Figure 4:
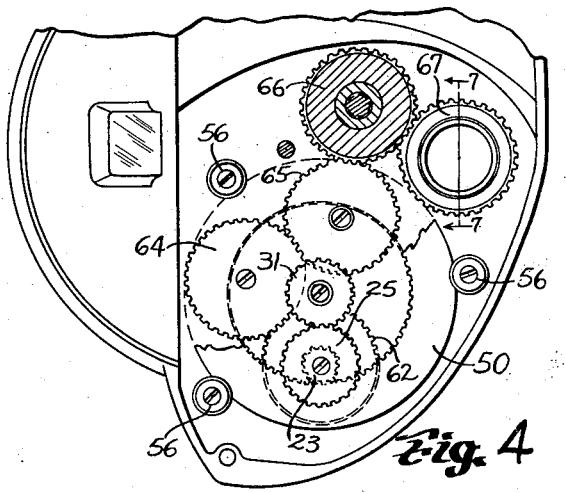
Fig. 4 is a similar sectional view nearer to the front of the instrument, the section being indicated by line 4—4 in Fig. 2.

Returning now to the gear 23 which as above referred to rotates simultaneously with gear 25, an annulus 50 is provided on its inner rim with gear teeth which mesh with the gear 23 so as to be rotated thereby (see Fig. 4). This annulus carries indicia on its front face visible through an opening 52 in the housing 30 (see Fig. 1) for indicating the power of the cylindrical lens or lenses registering with the sight opening 54 of that lens battery of the instrument. The outer rim of annulus 50 is engaged by three spaced rollers 56, each roller having a groove or kerf for receiving and positioning the rim of the annulus. In this way an indicia corresponding to the power of the cylindrical lens or lens combination before the eye of the patient appears automatically in the opening 52 when the knob 20 is rotated to bring the lens into registry with the sight opening 54.

Figure 6:
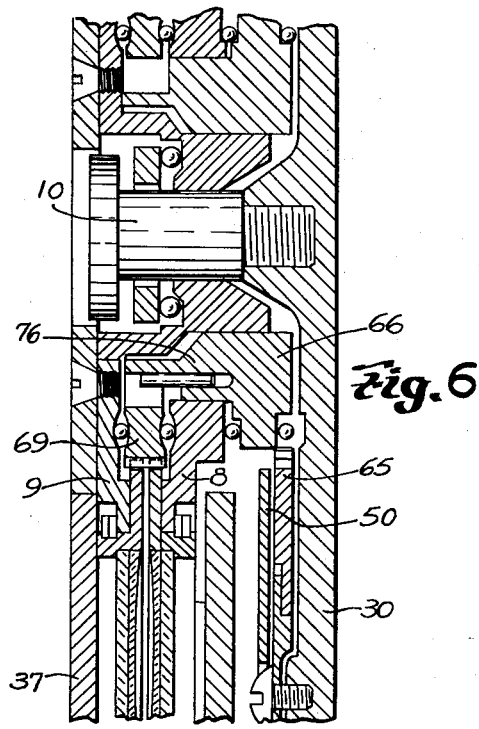
Fig. 6 is a sectional view on an enlarged scale showing the common drive for the two sets of lens cells shown in Fig. 2.
Figure 7:
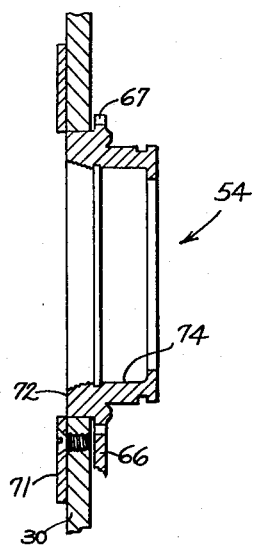
Fig. 7 is a sectional view through the sleeve in the sight opening, taken on the line 7—7 in Figures 1 and 4.

Concentric with the knob 20 and shaft 21 is an axis control 58. This control 58 is fixed to a sleeve or hub 60 journaled in bearing 75. An arm 59 extending from the control 58 gives visual indication of the axis to which the cylindrical lens is turned, and is also of assistance manually in turning the control 58. A gear 62 (compare Figs. 2 and 4) may be formed integrally with the inner end of hub 60, and when the control 58 is turned, rotating gear 62, it drives a train of gears 64, 65, 66 and 67 of which the gear 66 is concentric with the stud 10 and has a hub 76 extending within and supporting the carrier 8. A gear 69, which is pinned to the hub 76 so as to rotate with the gear 66, surrounds the stud 10 and lies between the carriers 8 and 9. The teeth of gear 69 mesh with gear teeth both on the rims of all five cells 15 and on the rims of all five cells 18 (see Figs. 5 and 6). The gears 66 and 69 will ordinarily be stationary when the carrier 8 or the carriers 8 and 9 together are rotated, with the result that the cells 15 and 18 rotate as satellites about the stationary gear 69. When the desired cell or combination of cells has been brought into alignment with the sight opening 54 by operation of the driver 27, the proper axis for the cylindrical lens or lenses can be obtained by turning the axis control 58 to rotate the gear train 64, 65 and 66 with resultant rotation of the cylindrical lenses in the cells. The orientation of the cylindrical axis is indicated (see Figs. 1 and 7) by a scale 71 fixed on the front of the housing 30 surrounding the sight opening 54 and by an index 72 marked on the rotatable sleeve 74 which lies in the practitioner's end of the sight opening. This rotatable sleeve 74 is sometimes used for mounting auxiliary lenses, as explained in the patent to Peck et al. 2,322,878 granted June 29, 1943. As shown in Fig. 7, this sleeve 74 carries the gear 67 which is driven in synchronism with the gear 69 from the gear 66. It will be apparent that the sleeve 74, being driven by the same gear train as the gear 69, will reflect every shift in the axis of the cylindrical lens positioned in the sight opening 54.

As above referred to, the space available within a refractor is cramped due to the need for limiting the overall depth of the instrument. Therefore, conventional driving mechanism for advancing a selected lens or lens combination into alignment with the sight opening of the instrument is too cumbersome to fit the space available. Our invention provides a very compact arrangement for advancing the selected lens or lenses into position; and at the same time the lenses, once brought into position, are adjusted into accurate alignment with the center line of sight opening. This is particularly important in view of the fact that these driving arrangements are tied in with mechanism for rotating the lens cells once they are in position, and with a dial for indicating the lens powers which are being used to test the vision of the patient.

In the drawings are found indications of mechanism for angling the lens batteries to take care of convergence of the patient's eyes for near vision tests. This mechanism is completely disclosed and is claimed in the application of John R. Wright, Serial No. 574,774 filed March 29, 1956, now Patent No. 2,923,200, issued Feb. 2, 1960.

We claim:

The combination in an eye testing instrument of a housing, superimposed carriers for cylindrical lenses mounted in said housing for rotation about a common axis, a plurality of lens cells rotatably mounted in each of said carriers, said lens cells having rim portions formed as gears, a gear rotatable about the common axis of said carriers and meshing with said rim portions of the cells mounted in said superimposed carriers, means for driving said last mentioned gear to adjust simultaneously the axes of the cylindrical lenses on said superimposed carriers, each of said carriers having a radial slot between each pair of adjacent rotatable lens cells, and a driver mounted in said housing for rotation about an axis parallel to and offset from said first axis, a locking plate secured to said driver for rotation therewith, said driver and locking plate being in overlapping relation with said superimposed carriers and on opposite sides thereof, said driver having a long pin and a plurality of relatively short pins, the radial slots in the carrier next adjacent said driver receiving said pins in succession to provide a driving connection for continuously advancing said carrier, the radial slots in the more remote carrier receiving only said long pin and having fixed thereto a star wheel cooperating with said locking plate, whereby arcuate movement of said long pin intermittently advances said carrier and engagement of said locking plate with said star wheel locks said carrier in position between such intermittent advances, said driver having arcuately spaced notches and spring biased detent means on the housing engageable within the notches for indexing the driver.

References Cited in the file of this patent

UNITED STATES PATENTS

| | | |
|---|---|---|
| 1,172,827 | Opitz | Feb. 22, 1916 |
| 1,240,289 | Woolf | Sept. 18, 1917 |
| 1,568,586 | Clement et al. | Jan. 5, 1926 |
| 1,596,717 | Clement et al. | Aug. 17, 1926 |
| 1,666,406 | Clement et al. | Apr. 17, 1928 |
| 2,322,878 | Peck et al. | June 29, 1943 |